United States Patent
Shapland

[11] 3,877,675
[45] Apr. 15, 1975

[54] SEAL CONSTRUCTION AND METHOD OF FORMING SEAL BETWEEN TWO ABUTTING SURFACES

[76] Inventor: James T. Shapland, 113 Penhurst Dr., Pittsburgh, Pa. 15235

[22] Filed: Feb. 13, 1974

[21] Appl. No.: 442,294

[52] U.S. Cl. ............... 251/144; 277/1; 277/226; 251/328; 137/68; 266/38; 222/561
[51] Int. Cl. .............................................. C21b 7/14
[58] Field of Search .......... 251/144, 326, 328, 368; 137/68, 72; 266/39, 42, 38, 34 PP; 277/226, 227, 229, 198, 228; 222/542, 559, 554, 555, 512, 561; 264/261, 262; 285/187, 287

[56] References Cited
UNITED STATES PATENTS

| | | | |
|---|---|---|---|
| 2,767,768 | 10/1956 | Jelinek | 277/228 X |
| 2,814,517 | 11/1957 | Razdow | 277/226 |
| 2,837,360 | 6/1958 | Ladd | 277/226 X |
| 3,007,600 | 11/1961 | Horner | 277/226 X |
| 3,147,016 | 9/1964 | Traufler | 277/226 |
| 3,251,603 | 5/1966 | Cobbledick et al. | 277/198 |
| 3,511,261 | 5/1970 | Bick et al. | 222/561 X |
| 3,618,834 | 11/1971 | Shapland, Jr. et al. | 222/561 X |
| 3,779,431 | 12/1973 | Tinnes | 222/561 |

*Primary Examiner*—William R. Cline
*Attorney, Agent, or Firm*—Walter P. Wood

[57] ABSTRACT

A seal construction and method of forming a seal between two abutting surfaces which are to be heated to relatively high temperatures. The seal is particularly useful in a sliding gate valve mechanism, which controls flow of liquid metal from a bottom pour vessel, to prevent metal from leaking between the nozzle block of the vessel and the top plate of the mechanism. The seal comprises an annular mortar-filled tube of a material which excludes air but chars or burns away at the temperature encountered. The tube is placed in a groove between the two surfaces. The mortar sets before the material of the tube burns away completely and hence does not bond to either surface.

5 Claims, 5 Drawing Figures

SEAL CONSTRUCTION AND METHOD OF FORMING SEAL BETWEEN TWO ABUTTING SURFACES

This invention relates to an improved seal construction and method of forming a seal between two abutting surfaces.

Although use of my invention is not thus limited, a seal formed in accordance therewith is particularly useful in a slidable gate valve mechanism which controls flow of liquid metal from a bottom-pour vessel, such as the mechanism shown in my joint application with E. P. Shapland Ser. No. 150,585 filed June 7, 1971, now abandoned, and the continuation thereof Ser. No. 377,385, filed July 9, 1973, both of common ownership. Such valve mechanisms usually include a stationary refractory top plate, the upper surface of which abuts a nozzle block in the bottom wall of the vessel. It is important to provide a tight seal between the abutting surfaces of the top plate and nozzle block to prevent liquid metal from leaking therebetween. The risk of leakage is most acute when the valve is closed to interrupt teeming temporarily, whereupon the pressure at the crevice materially increases. It is known to form a dry seal, as shown for example in the aforementioned application, but this requires a nearly perfect match between the plate and nozzle and hence is unduly costly. Alternatively a layer of mortar may be placed between the plate and nozzle, but the mortar must be applied uniformly and in exactly the right quantity or the plate does not seat properly. Also mortar often bonds to the surface of the plate and nozzle, and these surfaces may be damaged when the plate is removed for inspection or replacement. Although I have illustrated my seal construction as applied in the foregoing environment, it is apparent it may be used elsewhere where similar problems are encountered.

An object of my invention is to provide an improved seal construction and method of forming a seal between two abutting surfaces in which mortar is automatically distributed uniformly and in exactly the right quantity.

A further object is to provide an improved seal construction and method which achieves the foregoing object, and also avoids bonding of the mortar to either of the abutting surfaces.

A more specific object is to provide an improved seal construction and method in which an annular tube is filled with a measured quantity of mortar and inserted in a groove formed in one or both abutting surfaces, said tube charring or burning away when heat is applied, but not completely until after the mortar sets, whereby the mortar is prevented from bonding to either surface.

IN THE DRAWING

Figure 1:
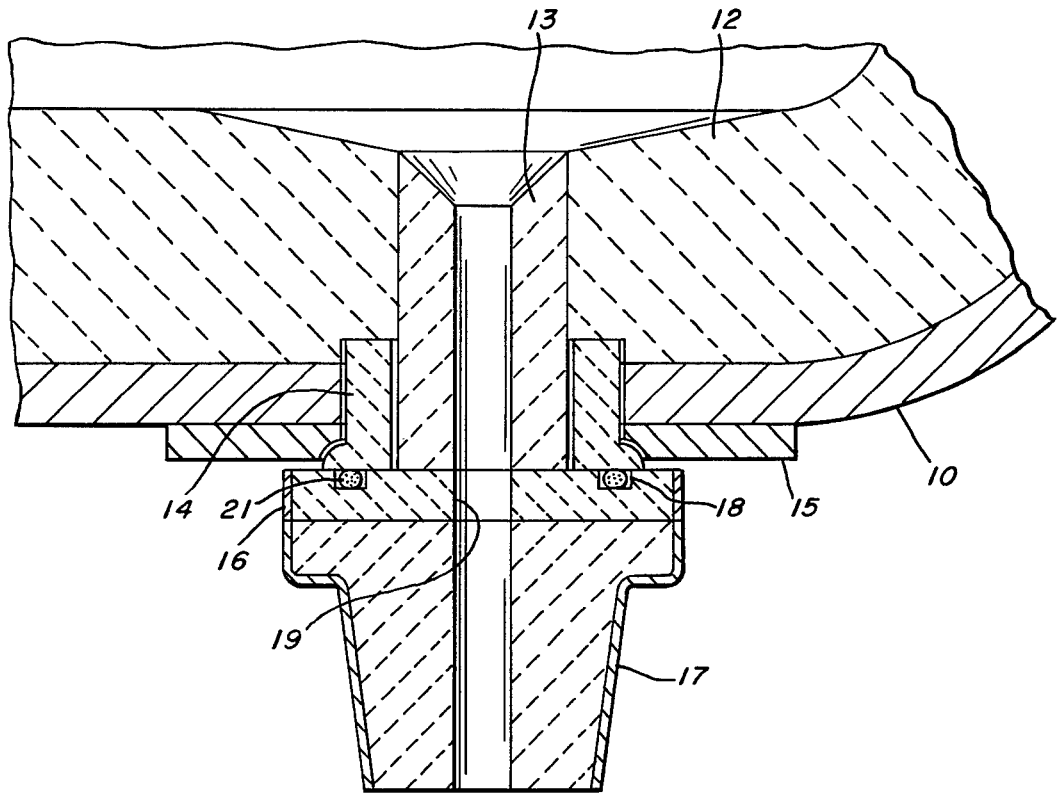
FIG. 1 is a vertical sectional view of a portion of a bottom-pour vessel and slidable gate valve mechanism embodying a seal constructed in accordance with my invention.
Figure 2:
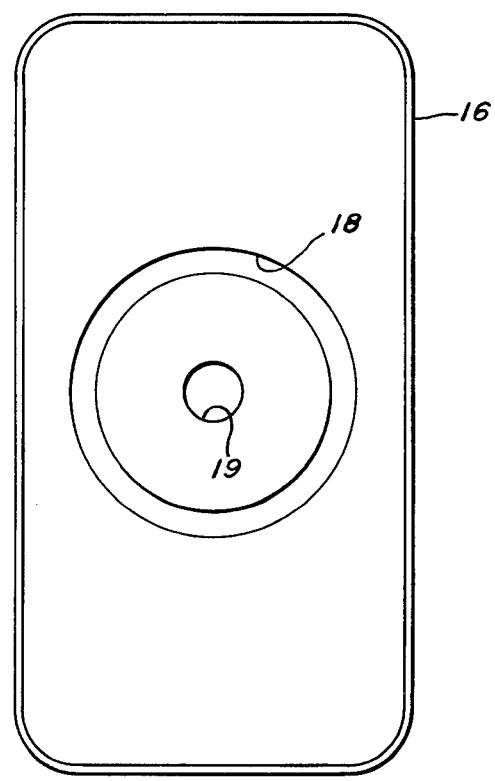
FIG. 2 is a plan view of the plate shown in FIG. 1.
Figure 3:
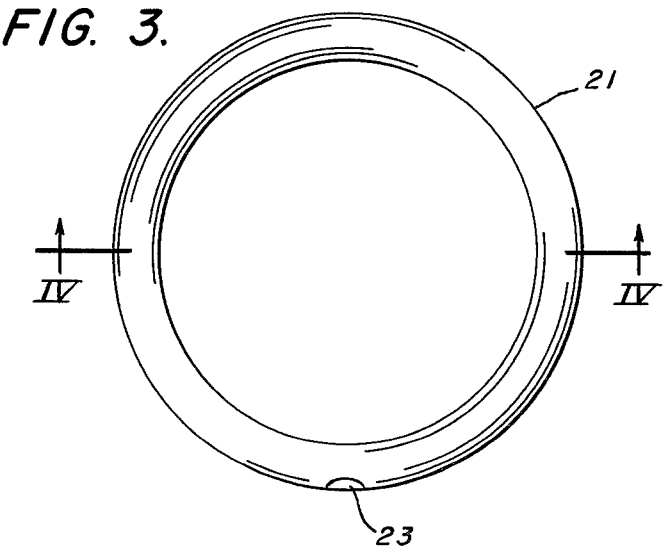
FIG. 3 is a plan view of the annular mortar-filled tube shown in FIG. 1.
Figure 4:
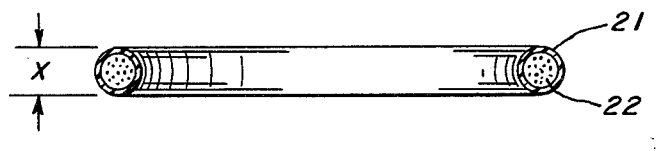
FIG. 4 is a section on line IV—IV of FIG. 3.

FIG. 1 shows a portion of a bottom-pour vessel which includes a metal shell 10, a refractory line 12, and inner and outer annular refractory nozzle blocks 13 and 14 fixed within the bottom wall of the vessel. These blocks protrude a short distance below the bottom wall through a metal mounting plate 15 fixed to the bottom wall. A metal encased refractory top plate 16 abuts the underside of the nozzle blocks, and a slidable gate 17 abuts the underside of the top plate to control discharge of material, usually liquid metal, from the vessel. The mechanism used to support and operate the gate may be of any standard or desired construction, such as that shown in the aforementioned application, and hence is not shown here. The gate itself and the top plate likewise may be of a construction similar to those shown in said application, except that the upper surface of the top plate has an annular groove 18 concentric with the teeming orifice 19, as shown in FIG. 2.

In accordance with the present invention, I fill an annular tube 21 with mortar 22. The tube may be of any material which excludes air from the mortar, but which chars or burns away at the temperature encountered at the bottom of the vessel, commonly 2000° F or higher. Examples are plastic film materials, such as cellophane, "Saran" wrap, or "Pliofilm," or even paper. The mortar may be of any suitable conventional composition, such as an aluminum silicate refractory with a binder of sodium silicate, aluminum phosphate or butyl rubber. Specific examples of suitable commercially available mortars are CE Super 3000 of Combustion Engineering, Inc. or 85-P of A. P. Green Refractories Co. The tube 21 has a filling opening 23 which I seal after filling the tube with mortar. The tube is of a size to be received within the groove 18 of the top plate 16, but the depth of the groove is slightly less than the vertical dimension of the tube. In an example for purposes of illustration only, the depth and width of groove 18 may be about ½ inch and 1¼ inch respectively, the vertical dimension $x$ of tube 21 may be about ¾ inch, and the diameter of groove 18 may be about 10 inches.

Figure 5:
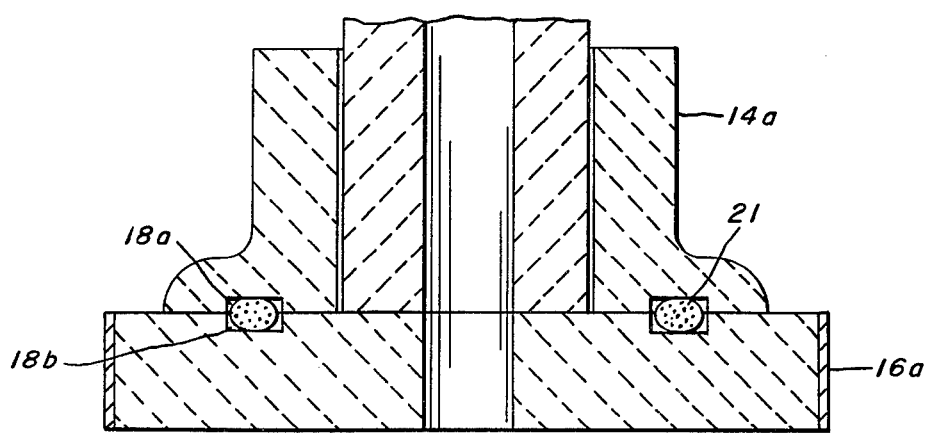
FIG. 5 is a vertical sectional view showing a modification.

FIG. 5 shows a modification in which the abutting surfaces of both the outer nozzle block 14a and the top plate 16a have mating annular grooves 18a and 18b respectively. The grooves 18a and 18b are of similar width and diameter, and their combined depth is approximately equal to the depth of the single groove 18 shown in FIG. 1.

When I assemble the gate mechanism, I place the mortar-filled tube 21 in the groove 18 or 18a and fix the top plate 16 or 16a in place beneath the nozzle. When the bottom wall is heated, either by preheating or on receiving liquid metal, the mortar sets to form a seal between the top plate and the nozzle such as prevents liquid metal from leaking therebetween. The material of the tube 21 chars, but the mortar sets before the material is completely charred or burned away. Therefore the mortar does not bond to either adjacent surface, but the hardened mortar completely fills the gap between surfaces.

From the foregoing description it is seen that my invention affords a simple seal construction and method which assure that the proper quantity of mortar is applied uniformly between two abutting surfaces to effect a proper seal. Since the quantity of mortar is pre-measured, nothing is left to the guesswork of individuals who install the parts of the gate mechanism.

I claim:

1. The combination, with two members which have abutting surfaces and are adapted to be heated to a relatively high temperature, at least one of said members having an annular groove in its surface, of an improved seal construction comprising an annular mortar-filled tube within said groove, the mortar of which is capable of setting at the temperature to which said members are heated, the material of said tube excluding air from the mortar therein, but being capable of charring or burning away at said temperature after the mortar sets.

2. A combination as defined in claim 1 in which one of said members is a nozzle block of a bottom-pour vessel, and the other is a top plate of a slidable gate mechanism.

3. A combination as defined in claim 2 in which said groove is formed in said top plate.

4. A combination as defined in claim 2 in which both said nozzle block and said top plate have mating grooves.

5. A method of forming a seal between two abutting surfaces, at least one of which has an annular groove, said method comprising filling an annular tube with mortar, placing said tube in said groove, and heating said tube to a temperature at which the mortar sets and the material of the tube chars or burns away, but remains long enough to prevent the mortar from bonding to said surfaces.

* * * * *

UNITED STATES PATENT OFFICE
CERTIFICATE OF CORRECTION

Patent No. 3,877,675    Dated April 15, 1975

Inventor(s) James T. Shapland

It is certified that error appears in the above-identified patent and that said Letters Patent are hereby corrected as shown below:

On the Cover Sheet, the following should be added:

--[73] Assignee: United States Steel Corporation, Pittsburgh, Pa. --

Signed and Sealed this fifth Day of August 1975

[SEAL]

Attest:

RUTH C. MASON
Attesting Officer

C. MARSHALL DANN
Commissioner of Patents and Trademarks